(12) United States Patent
Maier et al.

(10) Patent No.: US 8,186,758 B2
(45) Date of Patent: May 29, 2012

(54) AUTOMOBILE SEAT HAVING A FOUR-LINK BACKREST PIVOTING MECHANISM AND A TWO-LINK SEAT PORTION PIVOTING MECHANISM

(75) Inventors: Jürgen Maier, Weitersweiler (DE); Jens Winter, Gau-Bischofsheim (DE); Thomas Dill, Heiligenmoschel (DE); Heinrich Hammann, Teschenmoschel (DE); Viktor Enns, Kaiserslautern (DE); Jaroslaw Sendecki, Homburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 345 days.

(21) Appl. No.: 12/353,499

(22) Filed: Jan. 14, 2009

(65) Prior Publication Data
US 2009/0230747 A1 Sep. 17, 2009

(30) Foreign Application Priority Data
Jan. 14, 2008 (DE) .......................... 10 2008 004 230

(51) Int. Cl.
*B60N 2/30* (2006.01)
*B60N 2/02* (2006.01)
(52) U.S. Cl. .................... 297/334; 297/378.1; 297/15
(58) Field of Classification Search ................. 297/321, 297/334, 340, 378.1, 15
See application file for complete search history.

(56) References Cited

U.S. PATENT DOCUMENTS

| | | | |
|---|---|---|---|
| 7,237,837 B2 * | 7/2007 | Queveau et al. | ................ 297/15 |
| 2005/0269830 A1 | 12/2005 | Epaud | |
| 2008/0122242 A1 | 5/2008 | Becker et al. | |

FOREIGN PATENT DOCUMENTS

| | | |
|---|---|---|
| DE | 10354272 A1 | 6/2005 |
| DE | 202005008494 U1 | 8/2005 |
| DE | 60210319 T2 | 12/2006 |
| DE | 102006033554 A1 | 3/2007 |

(Continued)

OTHER PUBLICATIONS

British Patent Office, British Search Report for British Application No. 0900536.4, Apr. 15, 2009.

(Continued)

*Primary Examiner* — David Dunn
*Assistant Examiner* — Tania Abraham
(74) *Attorney, Agent, or Firm* — Ingrassia Fisher & Lorenz, P.C.

(57) ABSTRACT

An automobile seat is provided that includes, but is not limited to a backrest, a seat portion, a backrest pivoting mechanism, and a two-link seat-portion pivoting mechanism. The seat portion is fastened to the backrest or the backrest pivoting mechanism so that it is pivotable about a first transverse axis and the backrest is fastened to the backrest pivoting mechanism so that it is pivotable about a second transverse axis, so that the backrest may be pivoted from a usage position in which the seat portion adopts a first position, forward about the second transverse axis into a non-usage position, in which the seat portion occupies a second position, in which the seat portion is displaced rearward with respect to the first position. The backrest pivoting mechanism is a four-link backrest pivoting mechanism, which is configured in such a manner that the second transverse axis may be displaced rearward into the non-usage position by pivoting the backrest.

19 Claims, 4 Drawing Sheets

FOREIGN PATENT DOCUMENTS

| | | |
|---|---|---|
| EP | 1930207 A1 | 6/2008 |
| EP | 2048023 A2 | 4/2009 |
| FR | 2907062 A1 | 4/2008 |
| FR | 2909602 A1 | 6/2008 |
| JP | 2003220864 A | 8/2003 |

OTHER PUBLICATIONS

British Patent Office, British Examination Report for Application No. 0900536.4, dated Nov. 16, 2011.

\* cited by examiner

AUTOMOBILE SEAT HAVING A FOUR-LINK BACKREST PIVOTING MECHANISM AND A TWO-LINK SEAT PORTION PIVOTING MECHANISM

CROSS-REFERENCE TO RELATED APPLICATION

This application claims priority to German Patent Application No. 102008004230.7-16, filed Jan. 14, 2008, which is incorporated herein by reference in its entirety.

TECHNICAL FIELD

The present invention relates to an automobile seat comprising a backrest, a seat portion, that is fastened to the backrest so that it is pivotable about a first transverse axis, a backrest pivoting mechanism, and a two-link seat portion pivoting mechanism, wherein the backrest is fastened to the backrest pivoting mechanism so that it is pivotable about a second transverse axis, so that the backrest may be pivoted from a usage position, in which the seat portion occupies a first position, about the second transverse axis forward into a nonusage position, in which the seat portion occupies a second position, in which the seat portion is offset rearward with respect to the first position.

BACKGROUND

DE 10 2006 033 554 A1 describes a foldable vehicle seat. The known vehicle seat comprises a backrest and a cushion carrier for the seat cushion, wherein the cushion carrier is fastened to the backrest by means of a supporting part in such a manner that the cushion carrier may be pivoted about a first transverse axis relative to the backrest. In addition, a backrest pivoting mechanism is provided for the backrest, wherein the backrest is fastened to the backrest pivoting mechanism so that it is pivotable about a second transverse axis. In this case, the second transverse axis is fixed, i.e. it is disposed immovably inside the automobile unless the entire vehicle seat were to be shifted in the longitudinal or transverse directions inside the automobile. The backrest may now be pivoted from a usage position, in which the backrest is disposed substantially upright, frontward about the second transverse axis into a nonusage position, in which the backrest is disposed substantially horizontally above the seat portion. The cushion carrier of the seat portion is thereby connected in such a manner to the backrest via the supporting part and to the vehicle floor via a two-link seat portion pivoting mechanism such that due to the movement of the backrest from the usage position into the nonusage position, the cushion carrier is moved from a first position into a second position, wherein in the second position, the cushion carrier is displaced rearward and lowered compared with the first position. Due to the rearward and downward displacement of the cushion carrier, in the nonusage position the backrest can approximately occupy the place that had previously been occupied by the seat cushion carrier of the seat portion, so that the vehicle seat in the nonusage position only takes up little space inside the vehicle.

The previously described known vehicle seat, however, has the disadvantage that the vehicle seat in the nonusage position still extends relatively far forward in the seat direction, even when the seat portion or the seat cushion carrier was displaced rearward by the pivoting movement. Thus, the known vehicle seat, for example, cannot be arranged in the second or third seat row of an automobile if the seat front located in front in each case is disposed relatively close to that seat row in which the known vehicle seat is located. In such a case, a collision could occur between the backrest of the vehicle seat and the backrest of another vehicle seat in the seat row located in front thereof. In addition, it is desirable in some cases that the seat portion is displaced further rearward inside the automobile when the vehicle seat is located in the nonusage position. Furthermore, the backrest in the nonusage position takes up a large amount of space in the height direction.

It is therefore an object of the present invention to provide an automobile seat which overcomes the previously specified disadvantages, which has a relatively simple structure, and can be folded in a particularly space-saving manner into a nonusage position. In addition, other objects, desirable features, and characteristics will become apparent from the subsequent summary and detailed description, and the appended claims, taken in conjunction with the accompanying drawings and this background.

SUMMARY

The automobile seat according to an embodiment of the invention comprises a backrest and a seat portion. The automobile seat further comprises a two-link seat-portion pivoting mechanism and a backrest pivoting mechanism, wherein the seat portion is fastened to the backrest or the backrest pivoting mechanism so that it is pivotable about a first transverse axis. The backrest is fastened to the backrest pivoting mechanism so that it is pivotable about a second transverse axis. Thus, the backrest may be pivoted from a usage position forward about the second transverse axis into a nonusage position. In the usage position, the backrest may be disposed upright for example, whereas in the nonusage position this may be aligned horizontally. When the backrest is located in the usage position, the seat portion occupies a first position. Due to the pivoting movement of the backrest into the nonusage position, the seat portion fastened to the backrest is also moved into a second position in which the seat portion is displaced rearward with respect to the first position. According to the innovation, the backrest pivoting mechanism is a four-link backrest pivoting mechanism, which is configured in such a manner that the second transverse axis may be displaced rearward by pivoting the backrest into the nonusage position.

Due to the rearward displacement of the second transverse axis, which corresponds to a rearward displacement of the backrest in the nonusage position, the backrest does not extend as far forward in the nonusage position as is the case in the prior art according to DE 2006 033 554 A1. On the contrary, the automobile seat according to an embodiment of the invention may be disposed particularly advantageously in a second, third, or rearmost seat row without the forward-pivoted backrest colliding with the backrest of a vehicle seat in the seat row located in front thereof. The automobile seat according to an embodiment of the invention therefore exhibits its advantages particularly in an automobile that has two or more seat rows located close to one another. In addition, the fastening of the seat portion to the backrest need not necessarily be made in a lower section of the backrest, which extends below the second transverse axis. On the contrary, the seat portion may also be fastened in an upper section of the backrest, which extends above the second transverse axis, especially as the rearward displacement of the seat portion into the second position is already taking place due to the rearward displacement of the second transverse axis or the backrest.

In a preferred embodiment of the automobile seat according to the invention, the four-link backrest pivoting mechanism is configured in such a manner that the second transverse axis may be displaced downward by pivoting the backrest into the nonusage position. In this way, the backrest takes up less space in the height direction in the nonusage position.

In a particularly preferred embodiment of the automobile seat according to the invention, the backrest comprises in relation to its longitudinal direction an upper section and a lower section. The upper section is disposed in front of the second transverse axis whereas the lower section extends behind the second transverse axis. At the same time, the seat portion is fastened to the lower section so that it is pivotable about the first transverse axis. In this way, the seat portion is displaced rearward both due to the pivoting movement of the backrest about the second transverse axis and also due to the rearward displacement of the backrest during pivoting into the nonusage position. Thus, the seat portion is displaced particularly far backward within the automobile so that in the nonusage position the backward-displaced backrest may approximately occupy the position which had previously been occupied by the seat portion in the first position. As a result, a particularly space-saving accommodation of the automobile seat in the nonusage position is achieved.

In a further preferred embodiment of the automobile seat according to the invention, a supporting device is provided, which may comprise, for example, the vehicle floor and/or a vehicle seat substructure. The four-link backrest pivoting mechanism comprises a first pivoted lever, which is fastened to the backrest so that it is pivotable about the second transverse axis on the one hand and which is fastened to the supporting device so that it is pivotable about a third transverse axis on the other hand, and a second pivoted lever, which is fastened to the supporting device so that it is pivotable about a fourth transverse axis on the one hand and is fastened to the backrest so that it is pivotable about a fifth transverse axis on the other hand. The second, third, fourth, and fifth transverse axis thus form a four-bar linkage in relation to a side view of the automobile seat, which on the one hand ensures a high stability of the backrest and on the other hand can be implemented particularly simply.

In an advantageous embodiment of the automobile seat according to the invention, the supporting device is a vehicle floor and/or a vehicle seat substructure. Thus, for example, the automobile seat may be fastened directly to the vehicle floor. However, it is further possible that the automobile seat has a vehicle seat substructure, which is in turn disposed on the vehicle floor, wherein the vehicle seat substructure could in turn be fastened displaceably on the vehicle floor.

In order to allow sufficient pivotability of the backrest with the aid of the four-link backrest pivoting mechanism, in a further preferred embodiment of the automobile seat according to the invention, the distance between the second and fifth transverse axis is configured to be shorter than the distance between the third and fourth transverse axis. The distances specified here and subsequently designate the distances between the transverse axes when these are viewed in the transverse direction, i.e. from the side.

According to a particularly advantageous embodiment of the automobile seat according to the invention, the third transverse axis is disposed higher than the fourth transverse axis.

According to a further advantageous embodiment of the automobile seat according to the invention, the fourth transverse axis is disposed behind the third transverse axis in the direction opposite to the seat direction.

In order to be able to implement the automobile seat in a constructively particularly simple manner, in a further preferred embodiment of the automobile seat according to the invention, the distance between the second and third transverse axis corresponds to the distance between the fourth and the fifth transverse axis. Thus, the first and second pivoted levers can be configured identically in order to reduce the number of components in the automobile seat according to an embodiment of the invention and therefore the manufacturing expenditure.

In a further particularly advantageous embodiment of the automobile seat according to the invention, the two-link seat portion pivoting mechanism cooperates with the four-link backrest pivoting mechanism in such a manner that the seat portion is inclined with respect to the horizontal in the first position and is disposed in the horizontal in the second position. Such an inclination of the seat portion in the first position is desirable since the vehicle occupant sitting on the seat portion may sit particularly securely on the automobile seat as a result. For this purpose, the seat portion should be inclined upward in the seat direction. In the second position of the seat portion, which could be designated as the stowing position, however, this is no longer necessary so that a particularly space-saving stowing is possible due to the horizontal arrangement.

In order to configure the space occupied by the automobile seat in the nonusage position as even smaller, in a further advantageous embodiment of the automobile seat according to the invention, the seat portion in the second position is further lowered compared with the first position.

In order to achieve a particularly simple two-link seat portion pivoting mechanism, in a further particularly advantageous embodiment of the automobile seat according to the invention, this comprises a third pivoted lever, which is fastened to the seat portion so that it is pivotable about a sixth transverse axis on the one hand and which is fastened to the supporting device so that it is pivotable about a seventh transverse axis on the other hand.

In a further advantageous embodiment of the automobile seat according to the invention, the third pivoted lever is inclined forward in the first position of the seat portion.

According to a further advantageous embodiment of the automobile seat according to the invention, the third pivoted lever is inclined backward in the second position of the seat portion.

In a further preferred embodiment of the automobile seat according to the invention, the third, fourth, and seventh transverse axis are disposed immovably with respect to the supporting device.

In a further preferred embodiment of the automobile seat according to the invention, a head rest is provided, which is disposed on the backrest so that it is pivotable about a pivot axis.

In a further particularly preferred embodiment of the automobile seat according to the invention, the pivot axis extends transverse to the seat direction, wherein in the nonusage position of the backrest, the head rest may be folded forward by at least 90o about the pivot axis. Due to the rearward displacement of the seat portion in the nonusage position of the backrest, a collision with the seat portion is prevented, wherein the folding of the head rests effects a space-saving shortening of the backrest in its longitudinal direction.

In a further particularly preferred embodiment of the automobile seat according to the invention, the seat portion is fastened to one of the pivoted levers of the four-link backrest pivoting mechanism so that it is pivotable about the first transverse axis. The seat portion is preferably fastened to the second pivoted lever. As a result, the assembly of the backrest is simplified.

In a further advantageous embodiment of the automobile seat according to the invention, the first transverse axis corresponds to the second or fifth transverse axis in order to reduce the number of pivot axes.

In a further advantageous embodiment of the automobile seat according to the invention, the first transverse axis is disposed on the first pivoted lever between the second and third transverse axis or on the second pivoted lever between the fifth and fourth transverse axis.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
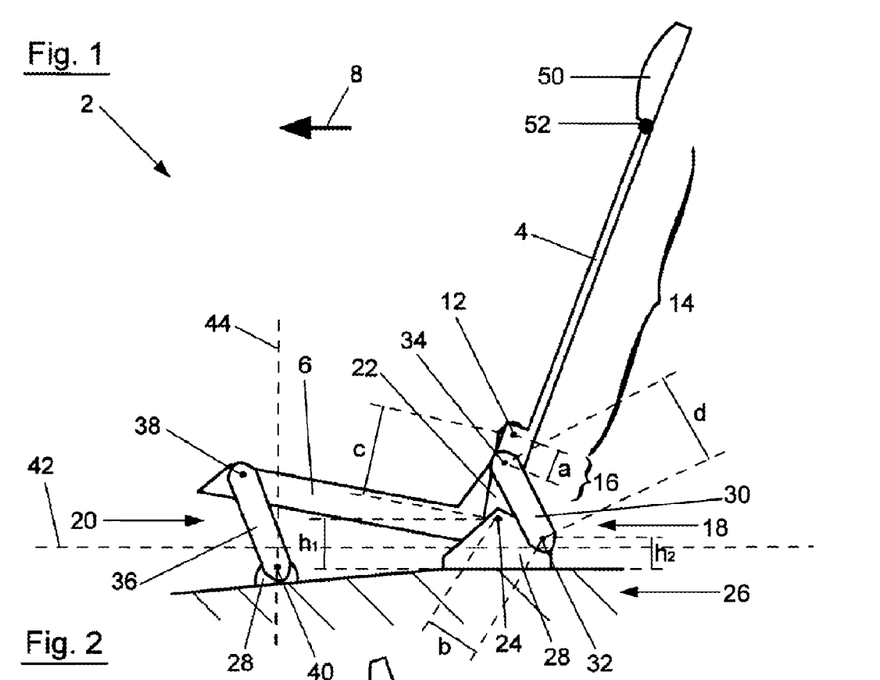
FIG. 1 shows a schematic side view of an embodiment of the automobile seat according to the invention with the backrest in the usage position and the seat portion in the first position.

FIG. 1 shows an embodiment of the automobile seat 2 according to the invention, which comprises a backrest 4 and a seat portion 6. The seat direction of the automobile seat 2 is indicated by means of the arrow 8 in the figures. The seat portion 6 is fastened to the backrest 4 with a rear section in the direction opposite to the seat direction 8 so that it is pivotable about a first transverse axis 10, the first transverse axis 10 being covered in FIG. 1 but it can be seen in FIG. 2 to FIG. 5. The backrest 4 may be pivoted forward in the direction of the seat portion 6 about a second transverse axis 12. At the same time, the backrest 4 is divided into an upper section 14 and a lower section 16 in relation to its longitudinal direction. While the upper section 14 extends from the second transverse axis 12, the lower section 16 is located after the second transverse axis 12. The seat portion 6 is thereby fastened at the end of the lower section 16 so that it is pivotable about the first transverse axis 10.

In order to be able to pivot the automobile seat 2, a four-link backrest pivoting mechanism 18 and two-link seat portion pivoting mechanism 20 are provided. The two pivoting mechanisms 18, 20 can each be disposed on both sides of the automobile seat 2, wherein only the left side of the automobile seat 2 will be described here and this description applies similarly to the right side of the automobile seat 2.

As has already been indicated, the backrest 4 is fastened to the four-link backrest pivoting mechanism 18 so that it is pivotable about the second transverse axis 12. The four-link backrest pivoting mechanism 18 initially comprises a first pivoted lever 22. The first pivoted lever 22 is fastened to the backrest 4 so that it is pivotable about the second transverse axis 12 on the one hand and is fastened to the supporting device 26 so that it is pivotable about a third transverse axis 24. The supporting device 26 may, for example, comprise a vehicle floor and/or a vehicle seat substructure on which corresponding fastening parts 28 are provided, which allow a pivotable fastening of the first pivoted lever 22 on the supporting device 26. The four-link backrest pivoting mechanism 18 further comprises a second pivoted lever 30, which is fastened to the fastening part 28 of the supporting device 26 so that it is pivotable about a fourth transverse axis 32 on the one hand and is fastened to the backrest 4 so that it is pivotable about a fifth transverse axis 34 on the other hand.

If the four-link backrest pivoting mechanism 18 is viewed in the transverse direction, i.e., from the side as in FIG. 1, the distance a between the second transverse axis 12 and the fifth transverse axis 34 is configured to be shorter than the distance b between the third transverse axis 24 and the fourth transverse axis 32 in order to allow a particularly extensive pivoting of the backrest 4, as will be explained in detail subsequently. On the other hand, the distance c between the second transverse axis 12 and the third transverse axis 24 corresponds to the distance d between the fourth transverse axis 32 and the fifth transverse axis 34, i.e. it holds that c=d so that the same components can be used for the first and second pivoted levers 22, 30. Furthermore, the third transverse axis 24 is disposed at a height h1 on the fastening part 28 while the fourth transverse axis 32 is disposed at a height h2 on the fastening part 28 of the supporting device 26, where h1 is greater than h2. The fourth transverse axis 32 is also located behind the third transverse axis 24 in the direction opposite to the seat direction 8.

The four-link backrest pivoting mechanism 18 thus forms a four-bar linkage whose corners are formed by the second, third, fourth, and fifth transverse axes 12, 24, 32, 34. Such a four-bar linkage ensures a particularly high stability or a particularly stable support of the backrest 4 as well as a particularly advantageous pivoting of the same about the transverse axis 12, as will be explained subsequently with reference to FIG. 1 to FIG. 5.

The two-link seat portion pivoting mechanism 20 has a third pivoted lever 36 which is fastened to the seat portion 6 so that it is pivotable about a sixth transverse axis 38 on the one hand and which is fastened to the fastening part 28 of the supporting device 26 so that it is pivotable about a seventh transverse axis 40 on the other hand. Both the seventh transverse axis 40 of the two-link seat portion pivoting mechanism 20 and also the third and fourth transverse axis 24, 34 of the four-link backrest pivoting mechanism 18 are disposed immovably with respect to the supporting device 26.

The mode of operation as well as further features of the automobile seat 2 will be described hereinafter with reference to FIG. 1 to FIG. 5.

FIG. 1 shows the backrest 4 in a substantially upright usage position. The backrest 4 is supported on the supporting device 26 via a four-link backrest pivoting mechanism 18. The seat portion 6 is fastened with its rear section to the lower section 16 of the backrest and is supported with its front section on the supporting device 26 via the two-link seat portion pivoting mechanism 20. In this first position of the seat portion 6, the seat portion 6 is inclined with respect to a horizontal 42, the seat portion 6 being downwardly inclined in the direction opposite the seat direction 8. In the first position of the seat portion 6, the third pivoted lever 26 is inclined forward in the seat direction 8 with respect to a vertical 44.

Figure 2:
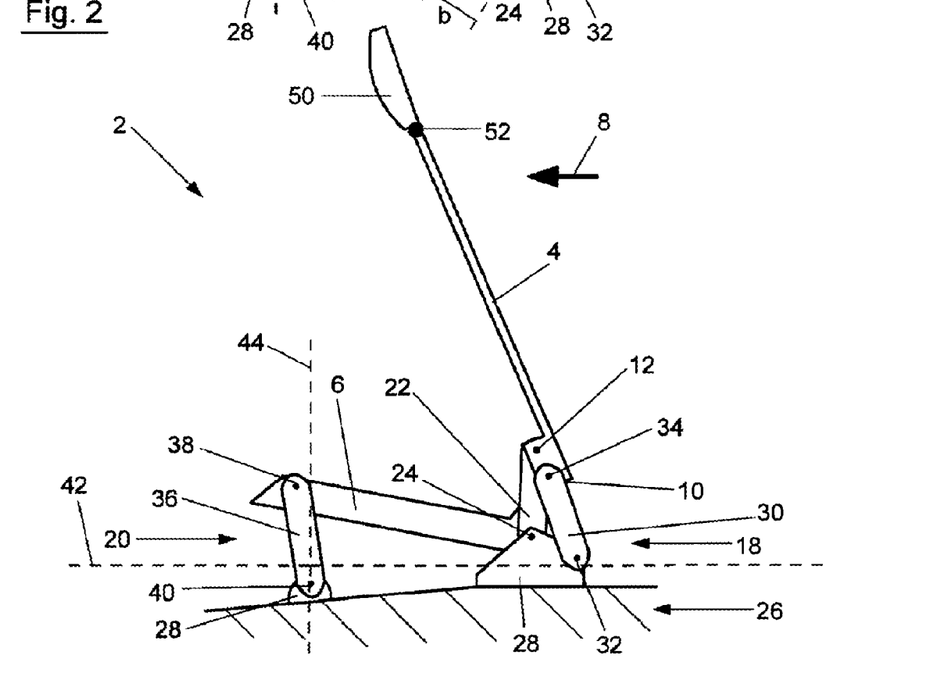
FIG. 2 to FIG. 4 show the automobile seat from FIG. 1 during pivoting of the backrest from the usage position into the nonusage position.
Figure 3:
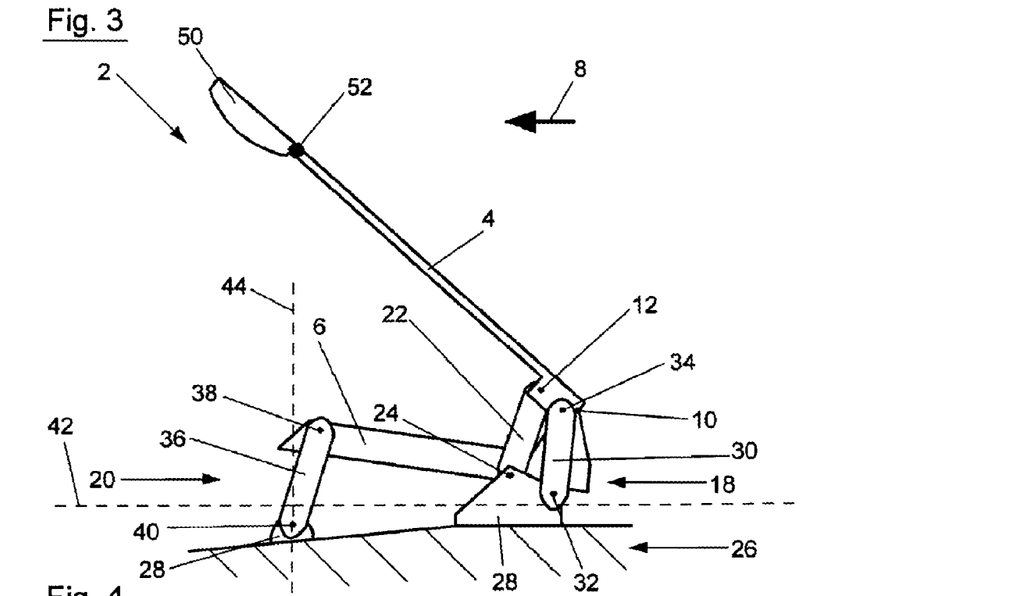
Figure 4:
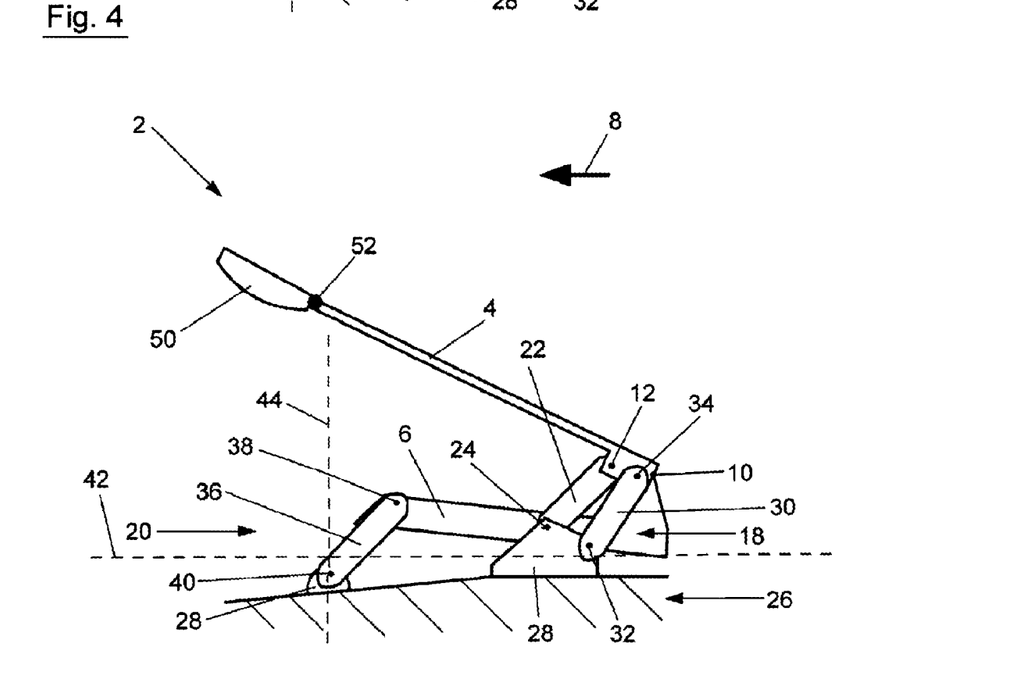
Figure 5:
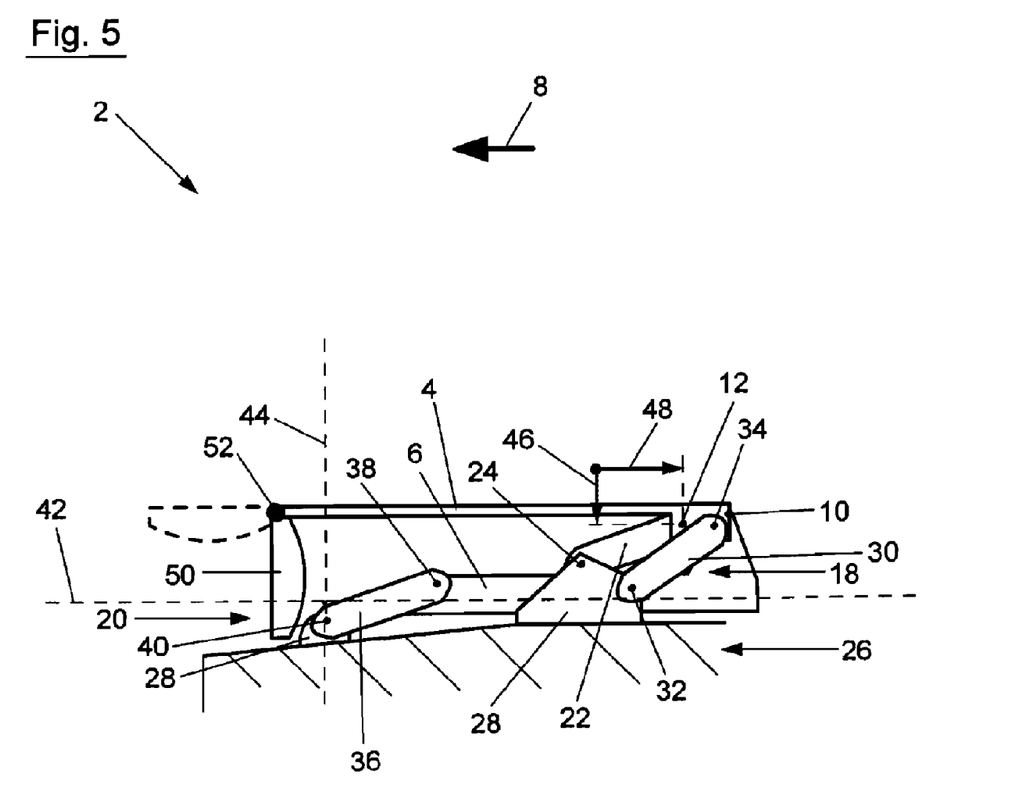
FIG. 5 shows the automobile seat from FIG. 1 to FIG. 4 with the backrest in the nonusage position and the seat portion in the second position.
Figure 6:
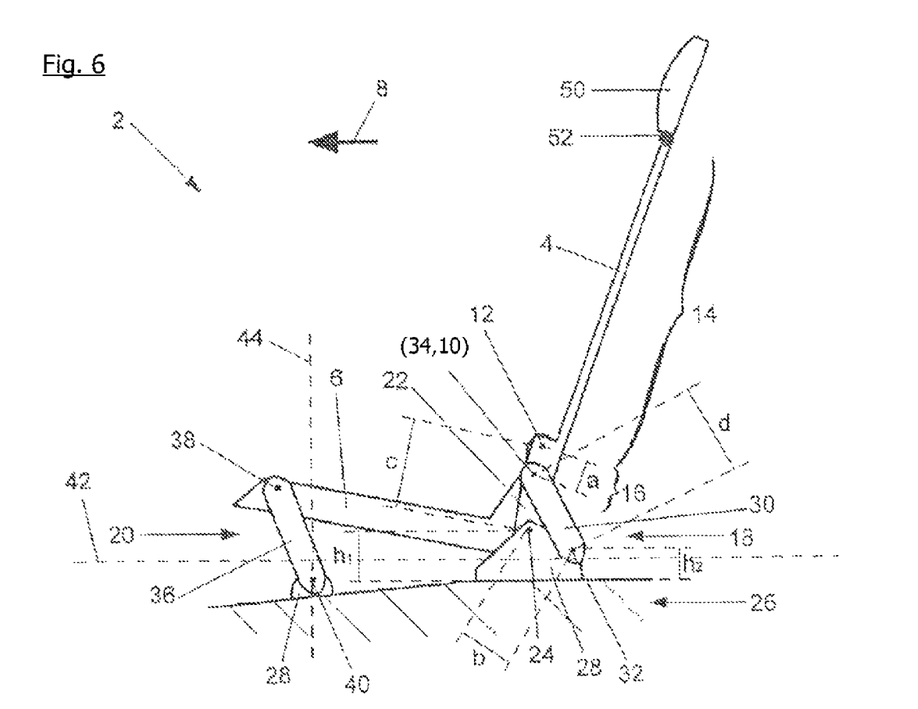
FIG. 6 shows the automobile seat from FIGS. 1-5 indicating the first transverse axis 10 also corresponding to the fifth transverse axis 34.

If the automobile seat 2 should not be required for a vehicle occupant, the backrest 4 can be pivoted from the usage position shown in FIG. 1 about the second transverse axis 12 via intermediate positions shown in FIG. 2 to FIG. 4 forward in the seat direction 8 into the nonusage position shown in FIG. 5. The four-link backrest pivoting mechanism 18 is thereby configured in such a manner that the second transverse axis 12 is displaced downward and backward by pivoting the backrest 4 about this second transverse axis 12 into the nonusage position, as is indicated by means of the arrows 46 or 48. Furthermore, the seat portion 6 is displaced backward as a result of the fastening to the backrest 4, which may be attributed on the one hand to the pure pivoting movement of the backrest 4 about the second transverse axis 12 and on the other hand, to the back displacement of the backrest 4 in the direction opposite the seat direction 8.

During the withdrawal of the seat portion 6 into the second position shown in FIG. 5, the third pivoted lever 36 further pivots about the transverse axes 38 and 40 so that in the second position of the seat portion 6, this is backwardly inclined with respect to the vertical 44 in the direction opposite the seat direction 8. A lowering of the seat portion 6 compared with the first position in FIG. 1 is effected both due to the backward pivoting movement of the third pivoted lever 36 and also due to the lowering of the backrest 4 into the nonusage position. The four-link backrest pivoting mechanism 18 and the two-link seat portion pivoting mechanism 20 are thereby coordinated with one another in such a manner that in the second position the seat portion 6 is disposed in the horizontal 42.

As can be seen from FIG. 1 to FIG. 5, a headrest 50 is further provided at the upper end of the backrest 4, this being pivotable about a pivot axis 52. The pivot axis 5 extends transverse to the seat direction 8, whereby in the nonusage position of the backrest 4 the headrest 50 may be folded forward about the pivot axis 52 by at least 90°, as shown in FIG. 5. In this position, the headrest no longer takes up as much space in the seat direction 8. This extensive folding of the headrest 50 is made possible by the seat portion 6 being displaced toward the rear in the nonusage position of the backrest 8.

In an advantageous alternative embodiment (not shown), the first transverse axis 10 may also be fastened to the four-link backrest pivoting mechanism 18 without needing to be fastened to the backrest 4. Thus, the first transverse axis 10 of the seat portion 6 could, for example, be fastened to one of the two pivoted levers 22, 30. In this case, the first transverse axis 10 is preferably disposed on the second pivoted lever 30 between the fifth and fourth transverse axes 34, 32. The first transverse axis 10 could also correspond to the fifth transverse axis 34.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A seat for an automobile, comprising:
   a backrest including a first transverse axis, a second transverse axis and a fifth transverse axis;
   a seat portion;
   a supporting device including a third transverse axis, fourth transverse axis and seventh transverse axis;
   a backrest pivoting mechanism; and
   a two-link seat portion pivoting mechanism comprising a sixth transverse axis,
   wherein the backrest is attached directly to the seat portion at a point along a single axis and pivotable thereabout, and the backrest is fastened to the backrest pivoting mechanism and adapted to pivot about the second transverse axis so that the backrest may be pivoted from a usage position in which the seat portion adopts a first position, forward about the second transverse axis into a non-usage position, in which the seat portion occupies a second position, in which the seat portion is displaced rearward with respect to the first position,
   wherein the backrest pivoting mechanism is a four-link backrest pivoting mechanism that is configured in such a manner that the second transverse axis may be displaced rearward by pivoting the backrest into the non-usage position.

2. The automobile seat according to claim 1, wherein the four-link backrest pivoting mechanism is configured in such a manner that the second transverse axis may be displaced downward by pivoting the backrest into the non-usage position.

3. The automobile seat according to claim 1, wherein the four-link backrest pivoting mechanism comprises a first pivoted lever fastened to the backrest and pivotable about the second transverse axis and fastened to the supporting device and pivotable about the third transverse axis, and a second pivoted lever that is fastened to the supporting device and pivotable about the fourth transverse axis and fastened to the backrest and pivotable about the fifth transverse axis.

4. The automobile seat according to claim 3, wherein the supporting device is a vehicle structure.

5. The automobile seat according to claim 3, wherein a distance between the second transverse axis and the fifth transverse axis is shorter than a second distance between the third transverse axis and the fourth transverse axis.

6. The automobile seat according to claim 3, wherein the third transverse axis is higher than the fourth transverse axis.

7. The automobile seat according to claim 3, wherein the fourth transverse axis is disposed behind the third transverse axis in a direction opposite to a seat direction.

8. The automobile seat according to claim 3, wherein a distance between the second transverse axis and the third transverse axis and a second distance between the fourth transverse axis and the fifth transverse axis are substantially the same.

9. The automobile seat according to claim 3, wherein the seat portion is fastened to a third pivoted lever of the four-link backrest pivoting mechanism and about the first transverse axis.

10. The automobile seat according to claim 9, wherein the first transverse axis is the fifth transverse axis.

11. The automobile seat according to claim 10, wherein the first transverse axis is disposed on the second pivoted lever between the fourth transverse axis and the fifth transverse axis.

12. The automobile seat according to claim 1, wherein the two-link seat portion pivoting mechanism cooperates with the four-link backrest pivoting mechanism in such a manner that the seat portion is inclined with respect to a horizontal position in the first position and is disposed in the horizontal position in the second position.

13. The automobile seat according to claim 12, wherein the second position is lower as compared with the first position.

14. The automobile seat according to claim 12, wherein a third pivoted lever is inclined forward in the first position of the seat portion.

15. The automobile seat according to claim 12, wherein a third pivoted lever is inclined backward in the second position of the seat portion.

16. The automobile seat according to claim 1, wherein the third transverse axis, the fourth transverse axis, and the seventh transverse axis are immovably disposed with respect to the supporting device.

17. The automobile seat according to claim 1, wherein further comprising a head rest that is disposed on the backrest and pivotable about a pivot axis.

18. The automobile seat according to claim 17, wherein the pivot axis extends transverse to the seat direction, wherein in the non-usage position of the backrest the head rest may be folded forward by at least about 90° about the pivot axis.

19. The automobile seat according to claim 1, wherein the single axis is the first transverse axis.

* * * * *